United States Patent
Rodriguez et al.

(10) Patent No.: US 8,720,175 B2
(45) Date of Patent: May 13, 2014

(54) CRIMPED FLAT WIRE AS CORE OF OVAL CORD

(75) Inventors: Javier Del Río Rodriguez, Lille (FR); Johan Pille, Roeselare (BE); Lieven Loncke, Zwevegem (BE)

(73) Assignee: NV Bekaert SA, Zwevegem (BE)

( * ) Notice: Subject to any disclaimer, the term of this patent is extended or adjusted under 35 U.S.C. 154(b) by 233 days.

(21) Appl. No.: 13/145,468

(22) PCT Filed: Nov. 23, 2009

(86) PCT No.: PCT/EP2009/065631
§ 371 (c)(1),
(2), (4) Date: Jul. 20, 2011

(87) PCT Pub. No.: WO2010/086043
PCT Pub. Date: Aug. 5, 2010

(65) Prior Publication Data
US 2011/0290397 A1  Dec. 1, 2011

(30) Foreign Application Priority Data
Jan. 28, 2009 (EP) .................................... 09151523

(51) Int. Cl.
*D02G 3/48* (2006.01)
(52) U.S. Cl.
USPC .......................................................... 57/212
(58) Field of Classification Search
USPC .......................................... 57/212–223, 311
See application file for complete search history.

(56) References Cited

U.S. PATENT DOCUMENTS

| | | | |
|---|---|---|---|
| 1,774,748 A | | 9/1930 | Gore |
| 3,402,546 A | * | 9/1968 | Peene .............................. 57/236 |
| 4,590,752 A | * | 5/1986 | Aubert et al. ........................ 57/9 |
| 5,581,990 A | * | 12/1996 | Van Giel et al. ................. 57/311 |
| 5,584,169 A | * | 12/1996 | Ikehara ........................... 57/212 |
| 5,878,564 A | * | 3/1999 | De Vos et al. ................... 57/311 |
| 6,016,647 A | * | 1/2000 | Kawatani et al. ................... 57/9 |
| 6,109,017 A | * | 8/2000 | Kawatani ....................... 152/527 |
| 6,119,747 A | * | 9/2000 | Yamanaka ..................... 152/527 |
| 6,273,161 B1 | | 8/2001 | Yamagami et al. |
| 6,311,466 B1 | * | 11/2001 | De Vos et al. ................... 57/212 |
| 6,412,263 B1 | * | 7/2002 | Lee et al. ......................... 57/210 |
| 6,425,428 B1 | * | 7/2002 | Onuma et al. ................ 152/527 |
| 8,407,977 B2 | * | 4/2013 | Cheng et al. .................... 57/212 |
| 2002/0062636 A1 | * | 5/2002 | De Vos et al. ................... 57/212 |
| 2004/0060275 A1 | * | 4/2004 | Cordonnier et al. ............ 57/213 |

(Continued)

FOREIGN PATENT DOCUMENTS

| | | |
|---|---|---|
| EP | 0264145 B1 | 12/1991 |
| EP | 0551124 B1 | 5/1998 |
| EP | 1066989 B1 | 11/2006 |
| JP | 10-88488 A | 4/1998 |
| JP | 2000-45191 A | 2/2000 |

(Continued)

*Primary Examiner* — Shaun R Hurley
(74) *Attorney, Agent, or Firm* — Foley & Lardner LLP

(57) ABSTRACT

A steel cord (10) adapted for the reinforcement of rubber products, the steel cord comprises a core (12) and a layer of filaments (14) with round cross-sections twisted around the core (12). The core (12) comprises a flat wire at a waveform, which lies in the plane of the flat wire. The wire is obtainable by first crimping a round wire and thereafter flattening the crimped wire. The filaments of the layer do not substantially contact each other to make spaces between each other to insure adequate rubber penetration into the cords. The steel cord has improvements on elongation at break.

9 Claims, 2 Drawing Sheets

(56) References Cited

U.S. PATENT DOCUMENTS

2004/0060631 A1* 4/2004 Cordonnier et al. .......... 152/527
2004/0108038 A1* 6/2004 Cordonnier et al. .......... 152/556
2012/0125512 A1* 5/2012 Pottier et al. ................. 152/556

FOREIGN PATENT DOCUMENTS

| JP | 2000-273775 A | 10/2000 |
| JP | 2004-18612 A | 1/2001 |
| JP | 2003-80904 A | 3/2003 |

* cited by examiner

CRIMPED FLAT WIRE AS CORE OF OVAL CORD

TECHNICAL FIELD

The present invention relates to a steel cord adapted for the reinforcement of rubber products and more particularly to a steel cord for use as reinforcing elements for the belt or breaker structure of pneumatic radial tires, especially pneumatic radial truck tires.

BACKGROUND ART

Pneumatic vehicle tires are generally reinforced with steel cords having substantially round cross-sections. A plurality of single filaments or strands are twisted together to form such a cord. Flat wires for the reinforcement of pneumatic tires have an improved lateral stiffness, require a thinner rubber ply, and have a better compression performance and a greater elongation at break than cords having substantially round cross-sections. However the latter have a better tensile strength and better fatigue performance than flat wire.

EP 0264145A1 discloses that a steel cord comprises a layer of steel filaments that are wound around an untwisted monofilament which has an elongated cross-section and a width-to-thickness ratio of at least 2. But in this cord structure that the filaments in the layer line contacts with the adjoining filaments, the space between each pair of sheath filaments is so narrow that rubber can not easily penetrate. Besides, as the width-to-thickness ratio becomes larger, the productivity is lowered.

EP 0551124A2 discloses that a steel cord comprises one wave-form or helical core steel filament, and a plurality of sheath steel filaments disposed around the core steel filament, which allows better rubber penetration for improved resistance to corrosion. However, such construction increases the thickness of the ply. In addition, the proposed structure has the same stiffness in the plane and perpendicular to the plane of the core, so it is not so flexible to deformation perpendicular to the plane of the core, which is disadvantageous for its use in belt or breaker plies of pneumatic radial tires.

DISCLOSURE OF INVENTION

It is an object of the invention to provide a steel cord with adequate rubber penetration coupled with a greater elongation at break.

A steel cord adapted for the reinforcement of rubber products, comprises a core, the core comprises a flat wire at a waveform with a ratio of a width W to the thickness T, which is $1.2 \leq W/T \leq 3.0$. The wavy flat wire is obtainable by first crimping a round wire and thereafter flattening the crimped wire. The steel cord further comprises a layer twisted around said core. Each filament of the layer around the core has a round cross-section. At least two of said filaments in the layer around the core do not substantially contact each other.

The wavy form is a crimp form obtainable by means of one pair of toothed wheels. Crimps may also be obtained by a set of cams. A crimp is a planar wave. However, depending upon the way of twisting the planar wave may not rotate or may rotate.

The amplitude of the wavy form ranges from 0.1 mm to 5.0 mm. For example, from 0.5 mm to 4.0 mm; for example, from 1.0 mm to 3.0 mm etc. If the amplitude of the wavy form is smaller than 0.1 mm, the spacing between the core and the layer is too small to allow rubber penetration and the productivity is lowered. If the amplitude of the wavy form is bigger than 5.0 mm, the spacing between the core and the layer is too big and the strength is lowered.

The pitch of the wavy form ranges from 3.0 mm to 15.0 mm. For example, from 4.0 mm to 12.0 mm; for example, from 5.0 mm to 10.0 mm etc. If the pitch of the wavy form is smaller than 3.0 mm, the spacing between the core and the layer is too big and the strength is lowered. If the pitch of the wavy form is greater than 15.0 mm, the spacing between the core and the layer is too small to allow rubber penetration.

The width-to-thickness ratio of the core is $1.2 \leq W/T \leq 3.0$, and by preference, lies between 1.5 and 2.5. A minimum ratio is necessary to keep the cord in place during its manufacturing process. The maximum ratio is determined by stability considerations.

The steel filaments in the layer surround the core, at least two of them do not substantially contact each other; and by preference, none of the adjacent metal filaments does contact each other so as to ensure more space for enabling rubber to penetrate to the core.

The planar wave of the core of the steel cord is made by first crimping a round wire and thereafter flattening the crimped wire by rolling thereby both making the wire flat and making the wave planar. Otherwise, if first rolling a round wire then crimping the flatten wire, the chance for wire fracture is great, which will result in reposition of the wire and manufacture efficiency is low. On the contrary, the method of manufacturing a steel cord according to the invention easily avoids the above problems and further improves manufacture efficiency.

Instead of integrating such a planar wavy filament in a cord structure, this planar wavy core filament may also be used as independent element for rubber reinforcement.

A steel cord according to the invention may be used in the carcass or in the belt structure of pneumatic radial tires, and particularly useful for use in truck tires.

BRIEF DESCRIPTION OF FIGURES IN THE DRAWINGS

The invention will now be described into more details with reference to the accompanying drawings.

FIG. 1 schematically shows a cross-sectional view of a steel cord incorporating present invention.

FIG. 2 schematically illustrates the method to make core wavy.

MODE(S) FOR CARRYING OUT THE INVENTION

Figure 1:
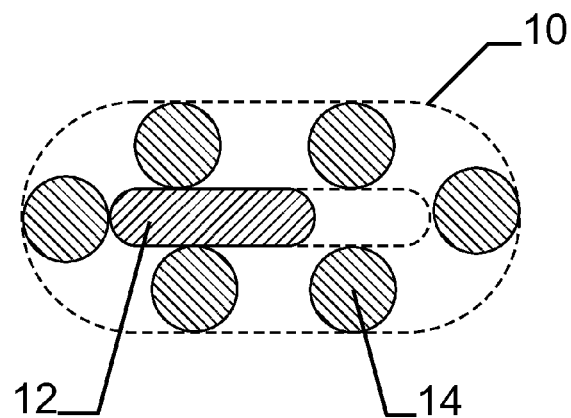

Referring to FIG. 1, a steel cord 10 adapted for the reinforcement of rubber products, comprises a core 12, which is a wavy flat wire, and six filaments 14 in a layer twisted around the core 12. Since the core 12 is crimped into wavy form, there are spaces between the core 12 and the adjacent filaments 14. An additional advantage of a wavy flat wire is that larger ratio of width-to-thickness can be reached than with cords where the flat core is not wavy.

Figure 2:
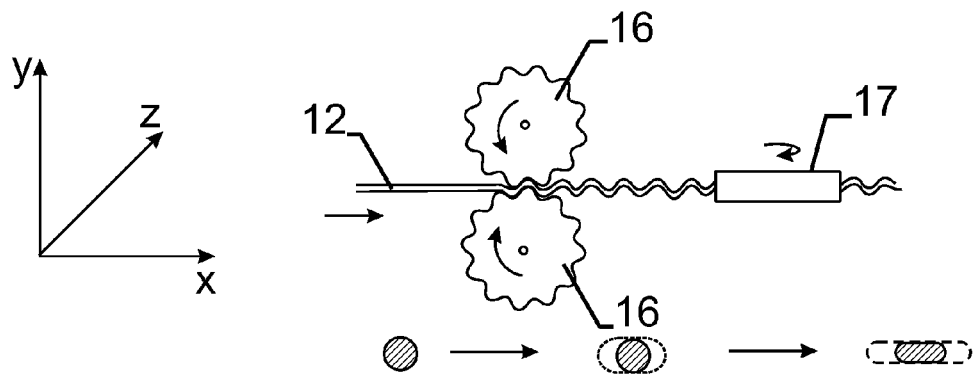

Referring to FIG. 2, a round core wire 12 goes through a pair of toothed wheels 16, and the core 12 is crimped into wavy form. Besides, the toothed wheels 16 may or may not be driven by external means. Thereafter, the round crimped wire is flattened by means of one or more pairs of rolls 17 which simultaneously flatten the round wire and make the wave planar and flat.

Figure 3:
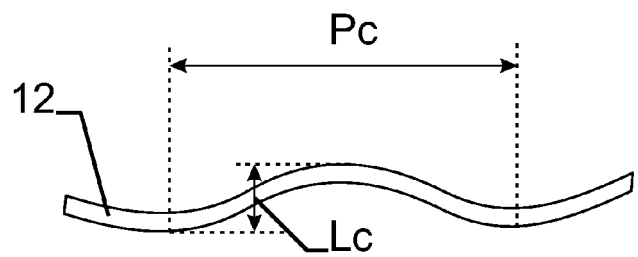
FIG. 3 is an upper view of the flattened and wavy core wire.

FIG. 3 shows a schematic diagram of a crimped core 12 flattened in the plane of a waveform. An amplitude Lc of the waveform is between 0.1 mm to 5.0 mm, which is measured from top to top with inclusion of core thickness, while a pitch Pc of the waveform is between 3.0 mm to 15.0 mm.

Figure 4:
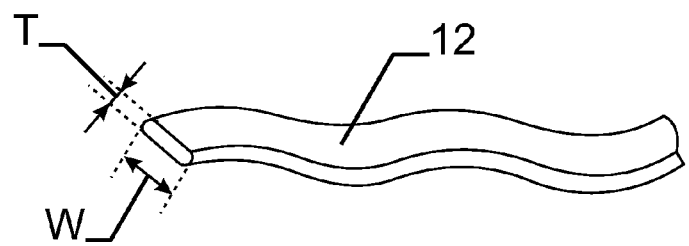
FIG. 4 is a schematic view of the flattened and wavy core wire.

FIG. 4 shows a perspective view of a crimped core 12 flattened in the plane of waveform with the width-to-thickness ratio 1.2≤W/T≤3.0.

Figure 5:
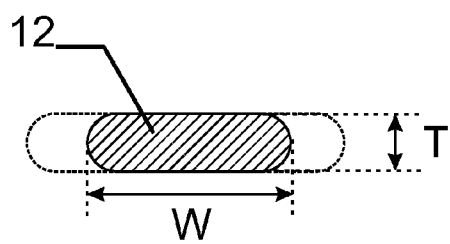
FIG. 5 is a cross-section of the flattened and wavy core wire.

FIG. 5 schematically shows a cross-sectional view of a crimped core 12 flattened in the plane of waveform with the width-to-thickness ratio 1.2≤W/T≤3.0.

A steel cord 10 with a wavy flat core according to the invention was built as follows. Starting product is a steel wire rod. This steel wire rod has following steel composition: A minimum carbon content of 0.65%, a manganese content ranging from 0.40% to 0.70%, a silicon content ranging from 0.15% to 0.30%, a maximum sulphur content of 0.03%, a maximum phosphorus content of 0.30%, all percentages being percentages by weight. A typical steel tire cord composition for high-tensile steel cord has a minimum carbon content of around 0.80 weight %, e.g. 0.78-0.82 weight %.

The steel rod is drawn in a number of consecutive steps until the required final diameter. In this example, the round diameter for the core is 0.38 mm and 0.34 mm for the steel filaments in the layer. The drawing steps may be interrupted by one or more heat treatment steps such as patenting.

The steel filaments are preferably provided with a coating which promotes the adhesion to rubber or with a coating which gives corrosion resistance to the wire. A rubber adherable coating is e.g. brass; a corrosion resistant coating is e.g. zinc.

As a matter of example only, the manufacture of the wavy flat core 12 starts with a round filament with diameter of 0.38 mm, which is firstly crimped by a pair of toothed wheels into a wavy form and further flattened in the plane of the waveform with final dimensions of a width of 0.430 mm and thickness of 0.340 mm, while the amplitude is 1.33 mm, and the pitch is 7.09 mm.

Six peripheral filaments with diameter of 0.34 mm are twisted around the core filament by means of a tubular twisting machine or by means of a double-twister.

This 1+6 steel cord according to the invention has been compared with a reference cord in which the core is only flattened but not crimped in wavy form.

Figure 6:
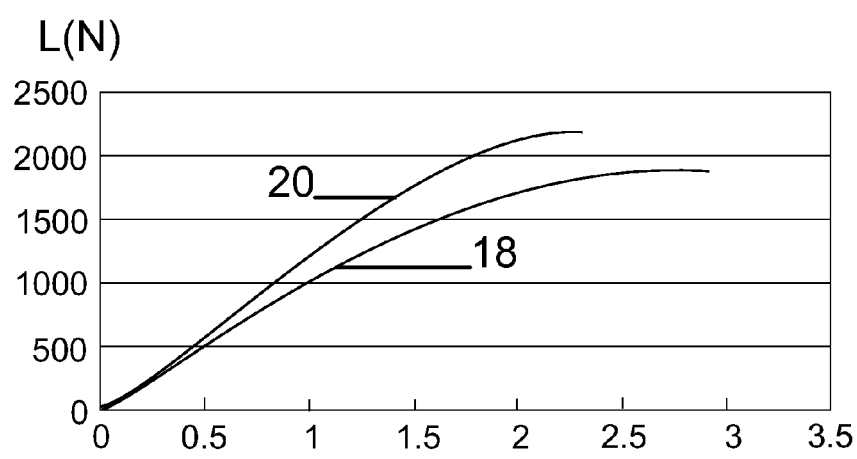
FIG. 6 shows a load elongation curve of a cord according to the invention.

FIG. 6 illustrates the load-elongation curves of the two steel cords. Curve 18 is the load-elongation curve for the steel cord with a wavy flat core according to the invention, while curve 20 is the load-elongation curve for the reference steel cord only with a flat core. Compared with the reference cord, the steel cord according to present invention has an improvement on elongation at break by 30%.

The invention claimed is:

1. A cord adapted for reinforcement of belt plies in a pneumatic tire, the cord comprising:
   a layer, and
   a core,
   wherein said layer comprises steel filaments that are wound around the core, and said core comprises a flat wire in a waveform, and
   wherein the wire is obtainable by first crimping a round wire and thereafter flattening the crimped wire, and said waveform lies in the plane of the flat wire.

2. A cord as claimed in claim 1, wherein said wire has an elongated cross-section with a ratio of a width W to the thickness T that is 1.2≤W/T≤3.0.

3. A cord as claimed in claim 1, wherein a pitch of said waveform is in a range from 3.0 mm to 15.0 mm.

4. A cord as claimed in claim 1, wherein an amplitude of said waveform is in a range from 0.1 mm to 5.0 mm.

5. A cord as claimed in claim 1, wherein said filaments in the layer around the core have a round cross-section.

6. A cord as claimed in claim 1, wherein at least two of said filaments in the layer around the core do not substantially contact each other.

7. A reinforcement for belt plies comprising a cord according to claim 1.

8. A flat wire adapted for reinforcement of rubber products obtainable by crimping a round wire followed by flattening said crimped round wire,
   wherein said flattened wire has a waveform in the plane of the flattened wire, and
   wherein the waveform in the plane of the flattened wire does not rotate.

9. A method of manufacturing a cord adapted for reinforcement of belt plies in a pneumatic tire, said method comprising:
   providing a round steel wire;
   crimping said round steel wire;
   flattening said crimped round steel wire:
   winding other steel wires around said flattened and crimped steel wire.

\* \* \* \* \*